May 1, 1934.    G. W. CARLSON    1,956,979
AUTOMOTIVE BRAKE
Filed July 9, 1929
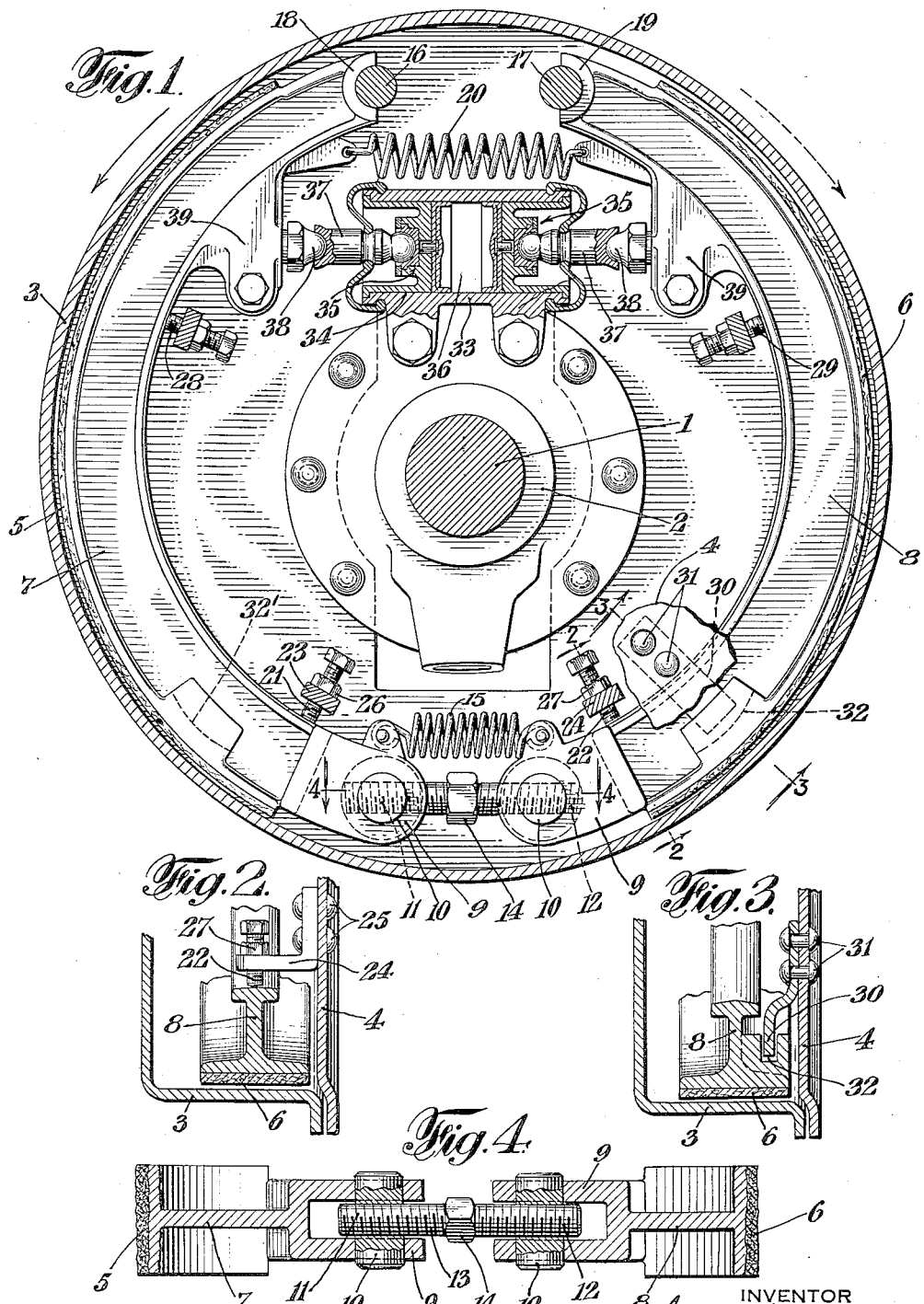
INVENTOR
Gustav W. Carlson
BY Ward Crosby & Neal
his ATTORNEYS Patented May 1, 1934

1,956,979

UNITED STATES PATENT OFFICE 1,956,979

AUTOMOTIVE BRAKE

Gustav W. Carlson, Cleveland, Ohio, assignor to Eaton Manufacturing Company, a corporation of Ohio Application July 9, 1929, Serial No. 376,908

3 Claims. (Cl. 188—78)

My invention relates to brakes and more particularly to internal expanding brakes of the so-called self energizing type such as are adapted for use on automotive vehicles.

In this type of brake it has been found that the brake is not nearly as efficient when the member to be braked is rotating in a rearward direction. That is, the self energizing action which takes place in forward rotation is greatly lacking in rearward rotation of the brake drum.

It has also been found, in structures prior to my invention, to be very difficult, if not impossible, to work out a mechanically operated actuating device for brakes of this general character that would function with the automotive vehicle moving in a rearward direction without giving a resulting kick-back on the foot pedal; such as when the operator applies his brakes while backing up. This is due to the mechanical chain connecting the brake pedal positively to the brake shoes when the brake is applied, and results from the floating action of the brake in its self energizing movement. It will therefore be appreciated that this kickback is of course intensified as the brakes wear; and thus this undesirable and annoying trouble will get worse progressively until a new adjustment is made. It is to be noted that this kick-back would also occur in mechanically actuated structures in the forward braking direction, except for such provision as is made in my copending application (Patent No. 1,724,452, granted August 13, 1929) where an auxiliary spring is provided for holding the secondary shoe against the brake anchor stop in the forward direction of rotation.

An object of this invention is to provide a brake which will give a substantially equal self energizing action upon rearward or forward rotation of the brake drum.

Another object of the invention is to provide a fluid pressure operated brake of the self energizing type, which will obviate the above described undesirable kick-back, and which will in fact entirely eliminate this kick-back in both directions of braking.

Another object of the invention is to provide a brake of simplified construction with few parts, which may be readily serviced and adjusted, and which will withstand severe usage while rendering efficient and dependable service.

The invention consists in the novel features, arrangements and combination of parts embodied in the apparatus hereinafter described as illustrating the preferred form of the invention, and the invention will be more particularly pointed out in the appended claims.

This application is a continuation in part of my copending application Ser. No. 8,338, filed February 11, 1925 for Automotive brakes (patent granted August 13, 1929, No. 1,724,452).

Further objects and advantages of the invention will more fully appear from the following description taken in connection with the accompanying drawing which shows, by way of example, the preferred embodiment of the invention.

Referring to the drawing:

Fig. 1 illustrates the brake and parts associated directly therewith, partly in section, Fig. 2 is a sectional view taken on line 2—2 of Fig. 1, Fig. 3 is a sectional view taken on line 3—3 of Fig. 1, and Fig. 4 is a sectional view taken on line 4—4 of Fig. 1.

Referring to Fig. 1, 1 represents the axle on which the brake is to be applied and 2 represents a hub portion mounted for rotation about the axis of said axle. 3 represents the brake drum, which is suitably attached to the hub 2. 4 represents a non-rotatable part such as a dust shield which is suitably attached to and supported by a non-rotatable part. The internal periphery of the drum 3 is adapted to be engaged by the brake surfaces 5 and 6 carried respectively by the brake shoes 7 and 8. The brake shoes 7 and 8 are of rigid construction, and in the present preferred embodiment are of substantially the same or similar construction and are therefore adapted to be interchangeable. The shoes 7 and 8 are each provided with a bifurcated end such as 9 (Fig. 4) carrying a pin 10 freely pivotally supported therein and in threaded engagement with a threaded end such as 11 or 12 of the articulating link 13, which carries at its median portion an engageable portion such as the hexagonal portion 14. The respectively opposite ends 11 and 12 of the link 13 are oppositely threaded, one for example carrying a left-hand thread, and the other a right-hand thread, so that upon suitable engagement of the portion 14 this link may be turned in either direction for respective adjustment toward and from each other or the adjacent ends 9 of the shoes 7 and 8. Suitable means is provided for retaining the said link in its adjusted position, and in the present embodiment this means takes the form of a tension spring 15 which is attached at its extremities to respectively adjacent ends, such as 9, of the shoes 7 and 8. This tension spring serves to place compressive force on the threads of the ends 11 and 12 in their engagement with the cooperating threads of the articulating pins such as 10 to maintain the link 13 in its adjusted position.

Anchor stops 16 and 17 are carried by a suitable non-rotating part, such for example as the dust shield 4, and are spaced circumferentially of said drum with respect to said articulated joint, in the present embodiment being positioned diametrically opposite to the articulated joint above described. These stops are normally engaged respectively by the adjacent ends 18 and 19 of the brake shoes 7 and 8; such normal engagement being effected by resilient means such as the tension spring 20, the ends of which are attached respectively to the ends of the shoes 7 and 8 adjacent the anchor pins 16 and 17. Adjustable means is provided for centering the brake means in a radial direction and comprises adjustable threaded members 21 and 22, which are carried by respective angle members 23 and 24 supported from the dust shield 4, such as by rivets 25; and the screws such as 21 and 22 are provided with lock nuts 26 and 27 for retaining them in adjusted position. Additional means similarly formed are illustrated in the present embodiment as 28 and 29, but such additional means are not essential to successful operation, but may be utilized if desired.

Means for centering the brake axially with respect to the drum is provided in the present embodiment by a tongue 30 (Fig. 3) which is supported on the dust shield 4, such for example as by rivets 31, and which extends into a groove 32 formed in a boss provided on the brake shoe cooperating with the tongue 30. It is understood that in order to make the shoes entirely interchangeable a similar groove 32' is provided in the other of the shoes.

Suitable operating means is provided for expanding the shoes, and while any suitable means which permits a free floating movement of the brake means, and which therefore should itself be a floating operating means, may be utilized, I have illustrated this operating means adapted to be operated with fluid pressure, such for example as by hydraulic pressure and designated in general as 33; thereby eliminating the kick-back objection above referred to as being inherent in mechanically operated brakes of this general type.

In its present preferred embodiment this fluid pressure actuating means 33 comprises a cylinder 34 supported from the relatively stationary part. The cylinder 34 carries a pair of independently movable piston members, such as 35, which are adapted to be separated by suitable fluid means being inserted therebetween, such as at 36. The piston rods, such as 37, engage projections, such as 38, which extend from enlargements 39 formed on each of the brake shoes 7 and 8 adjacent their ends 18 and 19, which are in engagement respectively with the anchor stop 16 and 17. Since both of the pistons 35 may be moved individually outwardly to the same or different degrees, and may also be moved together in the same direction under the influence of the self energizing action, depending upon the floating condition of the brake and the self energization thereof, this operating means provides the necessary floating means for this type of brake. However, no matter what position the brake shoes assume in operation due to the floating and self energizing action, the pressure induced in cylinder 36 between the pair of pistons 35, as a result of a given pressure on the brake pedal or the like, remains substantially constant; and the movement of the shoes to the left or right is readily accommodated and results merely in a movement of the pistons in a corresponding direction and to a corresponding degree, without resulting in any kick-back.

It is to be understood that this operating means, while highly desirable for the reasons above given, is nevertheless only one of the novel features of the invention. Other features of the invention may be utilized with other suitable operating means.

It will be understood from the above description that the method of construction and support for the brake means allows the same to be moved peripherally in its entirety, i. e. all points included in the brake shoe chain from the extremity of the end 18 to the extremity of the end 19 are adapted to be moved peripherally, all of which will be better understood from the following description of the operation.

*Operation*

First, the drum 3 will be considered with its rotating direction as indicated by the full line arrow on Fig. 1. When the operating means, such as 33, is provided with suitable motive means, such as a fluid introduced between the pistons 35, the ends 18 and 19 tend to move away from the anchor stops 16 and 17, and in fact, due to the slight clearance between the brake facings 5 and 6, the ends 18 and 19 do move a slight distance from their respective anchor stops; at which time, however, the brake drum 3 is engaged by the facings of the brake shoes and a resultant force is encountered which frictionally moves the shoes 7 in the direction of rotation of the drum, thereby delivering this frictional force, which is a function of the rotative speed of the drum, to the connected shoe which causes the end 19 to firmly abut against the anchor stop 17. The shoe 7 therefore moves in an anti-clockwise direction, pushing the shoe 8 against the stop 17; and with the parts in this position the greater the torque of the drum, the greater will be the tendency for the brake shoes to "wrap" against the internal surface of the drum to thereby firmly grip the same and cause the desired servo-braking or self energizing action, which action is well understood by those skilled in the art. As is well understood, this increased braking force is a direct result of the self energizing action, and is increased in proportion to the increase of the torque of the drum, so that with a constant force applied through the brake operating means, the effective braking action will be in direct proportion to the torque of the drum, which will be in direct proportion to the torque energy exerted by the drum.

Due to the fact that the brake is supported in a fully floating condition, and made possible, in the present embodiment, by the construction of the brake which includes the double pivotal or articulated joint, the brake shoes 7 and 8 will always readily assume a concentric position with respect to the inner periphery of the drum 3 when the brake is in operation, i. e., the ends of the shoes adjacent the pivotal connection are permitted a limited movement in an angular and in a radial direction; thereby insuring a full wrapping action in which the greatest frictional resistance is provided.

When the drum rotates in the opposite direction, as indicated by the dotted arrow on Fig. 1, the operation of the brake is identical with that heretofore described, except that the ultimate and positive anchoring of the brake takes place against the anchor stop 16, and the brake thereby wraps against the drum in the opposite direction from that heretofore described; but with identically the same effect.

During the self energizing or servo-braking action in either direction, as has been pointed out, the shoes move in the direction of the drum until one of the ends 18 or 19 abuts its respective stop 16 or 17. It is during this movement, during the braking operation, that, by the novel and useful means of my invention, the kick-back objection inherent in the usual mechanically operating actuating means is entirely eliminated, due to the fact that the pair of pistons 35 in their separated position—and while held outwardly relative to each other by the fluid pressure—move together in the same direction with the brake shoes carrying between them the fluid at a substantially constant pressure.

Certain details disclosed but not claimed herein are claimed in my prior patent herein referred to.

Having thus described my invention with particularity with reference to its preferred form, and having illustrated one modification thereof, it will be obvious to those skilled in the art, after understanding my invention, that other changes and modifications may be made therein without departing from the spirit and scope of my invention, and I aim in the appended claims to cover such changes and modifications as are within the scope of the invention.

What I claim is:

1. In brake mechanism, the combination of a drum, a fully floating self-energizing brake therefor comprising two shoes adjustably connected together by means permitting relative adjustment of the shoes circumferentially of the drum, two independent anchor stops which respectively cooperate with the ends of said shoes opposite to those which are adjustably connected together, spring means for normally holding said shoes in engagement with said stops, independent actuating means for said shoes cooperating with the ends thereof which engage said stops and floatingly arranged to permit a floating movement of said shoes circumferentially of said drum in either direction, and adjusting means cooperating with said adjustably connected ends of said shoes and whereby said ends may be independently adjusted radially of said drum.

2. In a brake mechanism, the combination of a drum, a fully floating self-energizing brake therefor comprising a plurality of shoes having their adjacent ends connected by floating adjustment means permitting relative adjustment of said shoes circumferentially of the drum, two independent anchor stops which respectively cooperate with the opposite ends of said brake, spring means for normally holding the ends of said brake in engagement with said stops, independently floating actuating means which respectively cooperate with the ends of said brake that engage said stops, and adjusting means cooperating with said adjustably connected ends of said shoes and whereby said ends may be independently adjusted radially of said drum.

3. In a brake mechanism, the combination of a drum, a fully floating self-energizing brake therefor comprising a plurality of shoes having their adjacent ends connected by floating adjustment means permitting relative adjustment of said shoes circumferentially of the drum, anchor means cooperating with the opposite ends of said brake, spring means for normally holding the ends of the brake in engagement with said anchor means, independently floating actuating means which respectively cooperate with the ends of said brake that engage said anchor means, and a plurality of radially adjustable screws which independently cooperate with said adjustably connected ends of said shoes and whereby said ends may be independently adjusted radially of said drum.

GUSTAV W. CARLSON.